United States Patent [19]

Detloff et al.

[11] Patent Number: 4,865,386
[45] Date of Patent: Sep. 12, 1989

[54] CAM ACTION VEHICLE SEAT ADJUSTER LATCH APPARATUS AND METHOD

[75] Inventors: Clement A. Detloff; Kirk C. Detloff, both of Southfied, Mich.

[73] Assignee: General Motors Corporation, Detroit, Mich.

[21] Appl. No.: 200,338

[22] Filed: Jun. 1, 1988

[51] Int. Cl.⁴ .............................. A47C 1/27; B60N 1/06
[52] U.S. Cl. ....................................... 297/375; 74/531; 188/82.3; 188/82.84
[58] Field of Search ................ 297/374, 375, 353–355; 248/396, 410, 412, 419; 188/82.2, 82.3, 82.84; 74/531

[56] References Cited

U.S. PATENT DOCUMENTS

| | | | |
|---|---|---|---|
| 642,178 | 1/1900 | Thomas et al. | 74/531 |
| 2,159,821 | 5/1939 | Sandberg et al. | 74/531 |
| 2,341,465 | 2/1944 | Monnot | 188/67 |
| 3,711,056 | 1/1973 | Gmeiner et al. | 248/429 |
| 3,793,903 | 2/1974 | Pellman | 188/82.84 X |
| 4,046,236 | 9/1977 | Hershman et al. | 74/531 X |
| 4,381,096 | 4/1983 | Roper | 248/429 |
| 4,738,156 | 4/1988 | Pipon et al. | 297/375 X |

FOREIGN PATENT DOCUMENTS

| | | | |
|---|---|---|---|
| 2218894 | 10/1973 | Fed. Rep. of Germany | 297/375 |
| 0090235B1 | 3/1983 | Fed. Rep. of Germany . | |
| 3211857A1 | 10/1983 | Fed. Rep. of Germany . | |
| 2110780 | 6/1983 | United Kingdom | 188/82.2 |

Primary Examiner—Peter R. Brown
Attorney, Agent, or Firm—Ernest E. Helms

[57] ABSTRACT

The present assembly provides a vehicle seat adjuster apparatus and method for a fore and aft adjustable or reclining vehicle seat. The preferred embodiment adjuster includes a first cam and a second cam in rolling contact with a portion of the seat or a rod to restrain relative movement thereof. Movement in one direction is restrained by the first cam and movement in a second direction, opposite the first, is restrained by the second cam. A handle is provided to release the cams from engagement to allow adjustment of the seat.

7 Claims, 3 Drawing Sheets

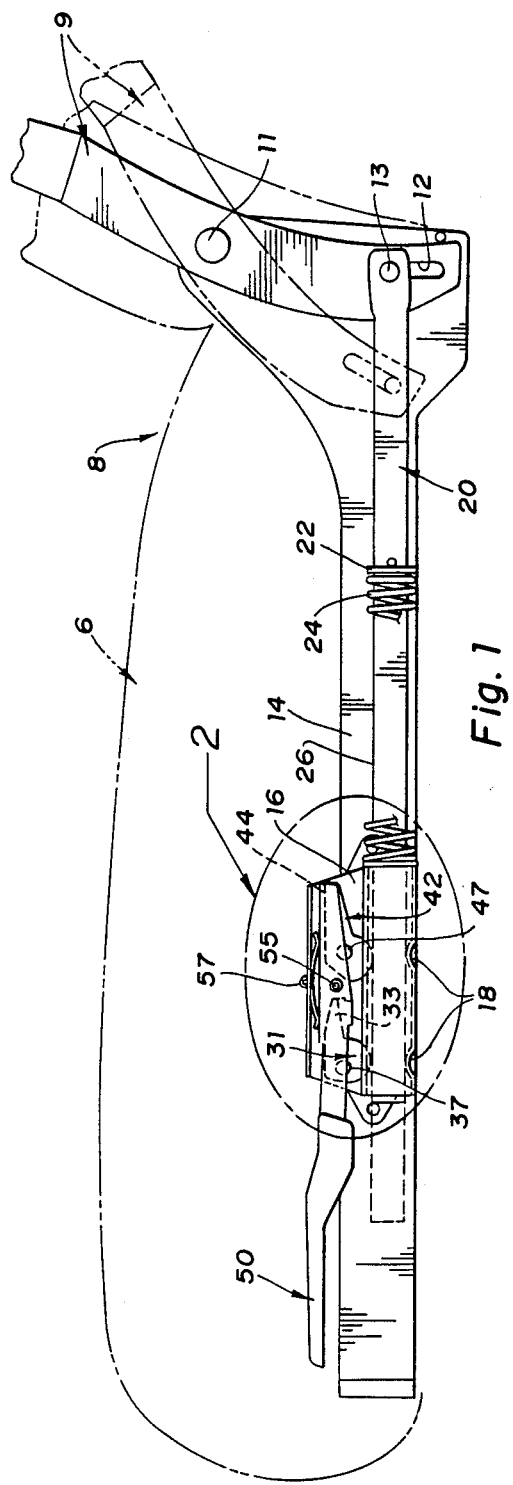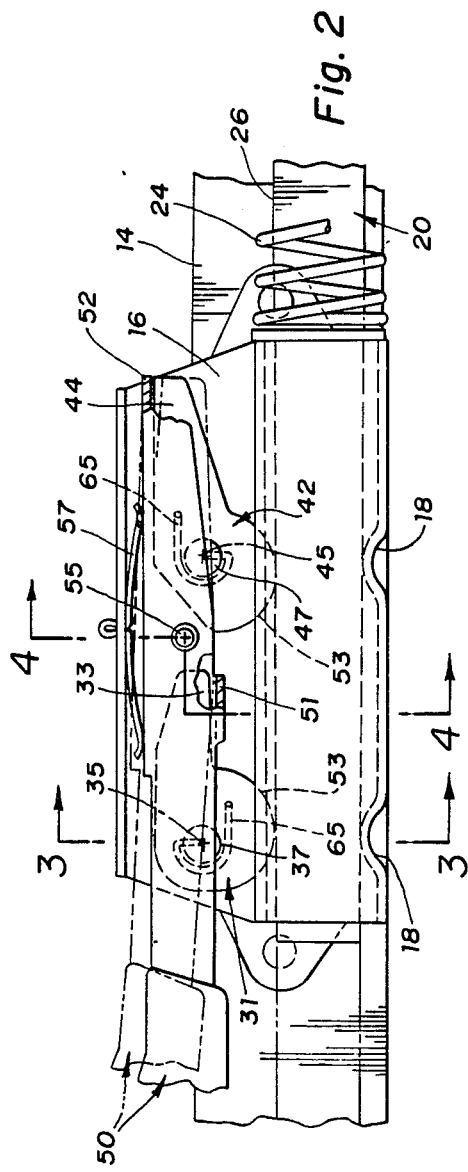

CAM ACTION VEHICLE SEAT ADJUSTER LATCH APPARATUS AND METHOD

FIELD OF THE INVENTION

The field of the present invention is that of vehicle seats adjusters. More particularly, the field of the present invention is that of adjusters for vehicle recliner seats and fore and aft adjustable seats and methods of utilization of the same.

DISCLOSURE STATEMENT

One type of vehicle recliner seat adjuster is the linear type. A vehicle recliner seat which uses a linear type adjuster has a seat back which is pivotally connected with the seat bottom, commonly referred to as the seat cushion. A rod is usually adjustably connected with the seat cushion and is pivotally connected with the seat back. There is provided a locking mechanism which fixes the length of the rod's extension between the seat back and the seat cushion. Therefore, as the rod is allowed to extend or retract, the angular position of the seat back with respect to the seat cushion is adjusted. One method of locking the position of the rod and thereby locking the angular orientation of the seat back is to surround the rod with a group of wedging washers. The wedging washers are urged into a position of engagement with the rod to lock the position of the rod. A second type of locking mechanism is a torsional spring which surrounds the rod in a selectively wound or unwound position to frictionally engage with the rod. A problem of both the above-described adjuster locking mechanisms is the high precision required in the machining of the individual parts. Also, since the locking mechanism in both designs relies upon frictional engagement with the rod, erosion of the rod over a period of time can cause the locking mechanism to malfunction and require replacement.

SUMMARY OF THE INVENTION

The present inventive adjuster provides a linear seat back recliner which is infinitely adjustable within predetermined angular limits having a locking mechanism which can automatically adjust to compensate for the wear and erosion which can occur to a locking mechanism over time. Additionally, the recliner seat back adjuster according to the present invention requires less precision in the machining of the parts since the adjuster automatically compensates for differences in tolerances of the parts. The present invention also provides a fore and aft horizontally adjustable seat adjuster.

In a preferred embodiment the present inventive recliner adjuster has a rod pivotally connected to the seat back of the seat. Mounted to the seat cushion is a plate which aligns the rod and above the rod pivotally mounts first and second cams. The cams are configured in such a manner that movement of the rod forwardly causes the first cam to rotate and capture the rod against the back plate preventing forward movement. Movement of the rod in a rearward direction causes the second cam member to rotate forcing the rod into the back plate thereby preventing backward movement of the seat back. A handle is provided which selectively engages projecting arms of the cams to remove the cam members from rolling contact with the rod thereby allowing adjustment in the inclination of the seat.

It is an object of the present invention to provide an apparatus and method of utilization thereof of an infinitely adjustable cam action linear recliner seat adjuster.

It is an object of the present invention to provide a seat adjuster for a vehicle recliner seat, the seat having a first member providing a seat back pivotally mounted with respect to a second member providing a seat cushion, the seat adjuster including a rod pivotally connected to one of the seat members, a first cam pivotally connected to the other seat member and in rolling contact with the rod whereby generally linear movement of the rod in a first direction causes rotation of the first cam to capture the rod with the other seat member, a second cam pivotally connected to the other seat member and in rolling contact with the rod whereby generally linear movement of the rod in a direction opposite the first direction causes rotation of the second cam to capture the rod with the other seat member, and selectively operable means to disengage the first and second cams from rolling contact with the rod whereby the angle of inclination between the first and second members can be adjusted.

It is an object of the present invention to provide a method of adjusting the inclination of a first member providing a seat back pivotally mounted and angularly reclined with respect to a second member providing a seat cushion, the method including pivotally connecting to one of the seat members a rod, pivotally connecting with the other seat member and placing in rolling contact with the rod a first cam whereby generally linear movement of the rod in a first direction causes rotation of the first cam capturing the rod with the other seat member, pivotally connecting with the other seat member a second cam and placing in rolling contact with the rod a second cam whereby linear movement of the rod in a direction opposite the first direction causes rotation of the second cam capturing the rod with the other seat member, and selectively disengaging the first and second cams from rolling contact with the rod whereby the inclination of the seat back with respect to the seat cushion can be adjusted.

It is an object of the present invention to provide a seat adjuster for a vehicle, the adjuster including a lower channel for connection with the vehicle, an upper channel slidably mounted fore and aft on the lower channel, the upper channel being connected with the seat, a first cam having a pivotal axis fixed with respect to one of the upper or lower channels and in rolling contact with the other channel wherein generally linear movement of the upper channel in a fore direction causes rotation of the first cam to capture the other channel with the one channel, a second cam having a pivotal axis fixed with respect to one of the upper or lower channels and in rolling contact with the other channel wherein generally linear movement of the upper channel in an aft direction causes rotation of the second cam to capture the other channel with the one channel, and selectively operable means to disengage the first and second cams from rolling contact with the other channel whereby the position of the upper channel with the lower channel can be adjusted.

Other objects and advantages of the present invention will become more apparent to those skilled in the art as the nature of the invention is better understood from a review of the accompanying drawings and a detailed description.

BRIEF DESCRIPTION OF THE DRAWINGS

FIG. 1 is a side elevational view of a preferred embodiment recliner seat adjuster of the present invention;

FIG. 2 is an enlargement of the portion encircled in FIG. 1;

DETAILED DESCRIPTION OF THE DRAWINGS

Figure 3:
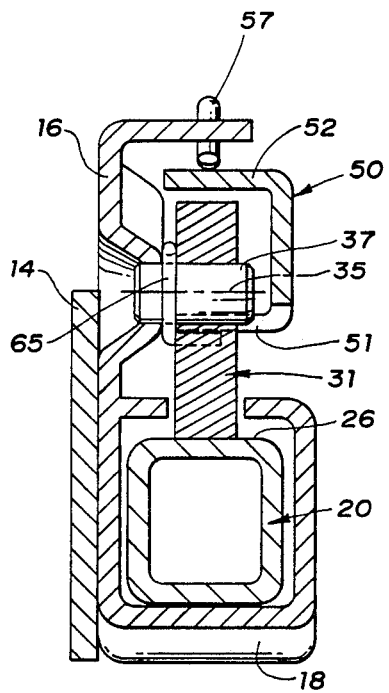
FIGS. 3 and 4 are sectional views taken along lines 3—3 and 4—4 of FIG. 2 respectively.

Referring to FIGS. 1-5, the reclining vehicle seat 8 has a first member or seat back 9 and a second member or seat cushion 6. The seat cushion can be fixed with respect to the vehicle (not shown) or horizontally adjustable with respect to the vehicle. The seat back 9 is pivotally mounted with respect to the seat cushion 6 along pivot pin 11.

Pivotally connected with the seat back 9 by a pin 13 captured in an eyelet 12, is an elongated rod 20. The rod 20 will typically have a rectangular cross-sectional area. The rod 20 on an end has a flange retainer ring 22.

The seat cushion 6 has a side frame 14. Mounted and fixably connected to the seat cushion 6 via the side frame 14 is a back plate 16. The back plate 16 has a lower floor with dimples 18 to align the rod 20. Captured between an end of back plate 16 and the retainer 22 is a coil spring 24 which acts to bias the seat back 9 in an upright position (FIG. 1 solid line).

Pivotally connected to the back plate are a first forward 31 and a second rearward 42 cam. Each of the cams 31, 42 has an arm 33, 44 projecting in a generally horizontal orientation. The cams are in rolling contact with the top 26 of the rod 20. As best shown in FIG. 2, movement of the rod 20 in a first forward direction to allow the seat back 9 to recline will cause the first cam 31 to rotate clockwise on pin 37 along fixed pivotal axis 35. The increased diameter 53 of first cam 31 will capture the rod 20 against the back plate dimples 18 to prevent further forward linear movement of rod 20.

In like manner, opposite linear movement of the rod 20 rearwardly (to raise seat back 9) will cause the second cam 42 to rotate counterclockwise on pin 47 on fixed pivotal axis 45 to an increased diameter 53 to capture the rod 20 against the dimples 18 of the back plate 16. Therefore the two cams 31 and 42 cooperate to fix the length of elongation of the rod 20 thereby fixing the angle of inclination of the seat back 9 with respect to the seat cushion 6. If desired, torsional springs 65 can be added to ensure rotation to cams 31 and 42 to an engage position with the top 26 of rod 20.

One advantage of the present invention is that erosion of the rod 20 or the cams 31 or 42 will only cause the cams 31 or 42 to rotate further before they reach the engaged position with the top 26 of the rod 20. Therefore adjustment for erosion and for machining tolerance is automatic.

Figure 4:
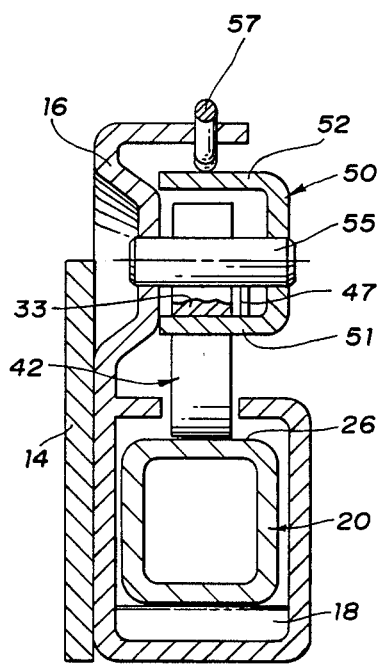
Figure 5:
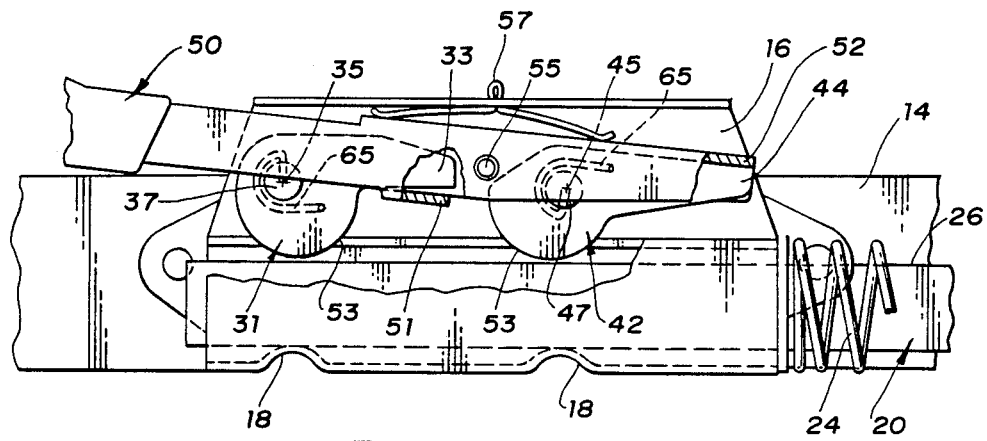
FIG. 5 is a view similar to FIG. 2 showing the adjuster in a release position.

To provide a selectively operable means to disengage the cams 31 and 42 from rolling contact with the top 26 of the rod 20 to allow adjustment of the seat back 9 there is a handle means 50. Handle 50 is pivotally connected by pin 55 to the back plate 16. Handle 50 has first lower 51 and second upper 52 flange means or legs for contemporaneous contact with cam arms 33 and 44 respectively (FIGS. 2, 3 and 4). In operation to release the cams 31 and 42 (FIG. 5) the handle is pulled upward and legs 51 and 52 pivot the cams arms 33 and 44 to non-engaged positions. Adjustment of the seat back 9 can now take place. Spring 57 is provided to bias handle 50 to a neutral position wherein the cams 31 and 42 will be in an engaged position. Therefore the release of handle 50 will return cams 31 and 42 to a locked position.

In another embodiment of the recliner adjuster (not shown), one of the cams will be placed underneath the rod and the cams will tend to force the rod against one another when in an engaged position.

The present invention includes a method of adjusting the inclination of a first member providing a seat back 9 pivotally mounted and angularly reclined with respect to a second member providing a seat cushion 6, the method including the following steps:

1. Pivotally connecting to one of the seat members 9 a rod 20.

2. Pivotally connecting with the other seat member and placing in rolling contact with the rod 20 a first cam 31 whereby generally linear movement of the rod in a first direction causes rotation of the first cam 31 capturing the rod 20 with the other seat member.

3. Pivotally connecting with the other seat member 6 a second cam 42 and placing in rolling contact with the rod 20 a second cam 42 whereby linear movement of the rod 20 in a direction opposite the first direction causes rotation of the second cam 42 capturing the rod 20 with the other seat member 9.

4. Selectively disengaging 50 the first 31 and second 42 cams from rolling contact with the rod 20 whereby the inclination of the seat back 9 with respect to the seat cushion 6 can be adjusted.

Figure 6:
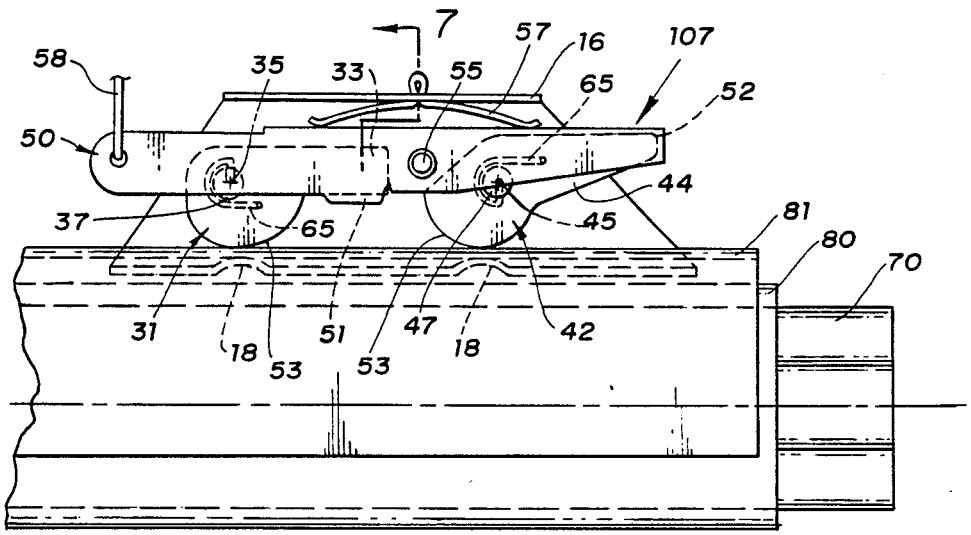
FIG. 6 is top plan view with portions removed of a preferred embodiment fore and aft horizontal seat adjuster according to the present invention.
Figure 7:
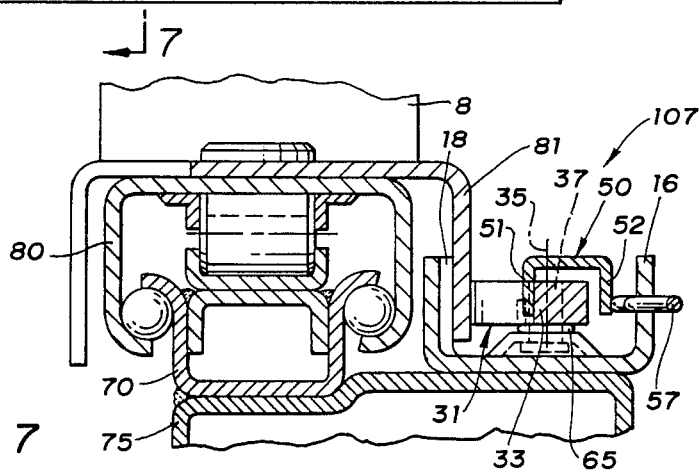
FIG. 7 is a sectional view taken along line 7—7 of FIG. 6.
Figure 8:
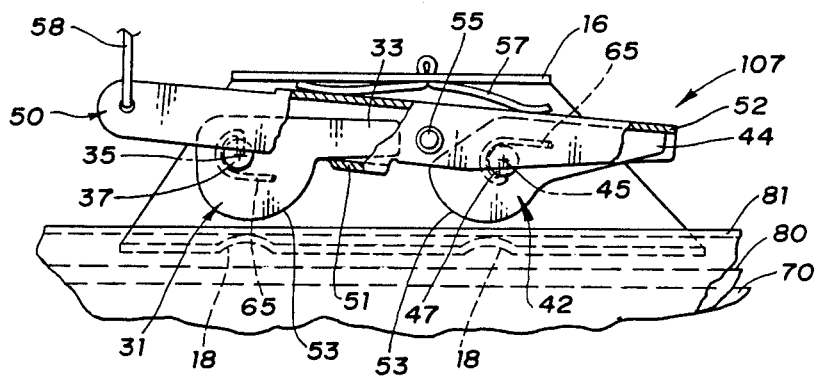
FIG. 8 a cut away view similar to FIG. 6 illustrating the adjuster in a release position.

Referring to FIGS. 6-8 a fore and aft horizontal vehicle seat adjuster 107 according to the present invention is provided. Like parts are given the same reference numerals as the embodiment shown in FIGS. 1-5. Adjuster 107 is a slave side adjuster which is controlled by a master side adjuster (not shown) via a cable 58. (A more detailed explanation of master slave seat adjuster can be found in Goodbred U.S. Pat. No. 4,711,589 commonly assigned.) However, the adjuster 107 could be used as the master side adjuster.

A first lower channel 70 is connected with the vehicle floor 75 in a fore and aft direction (FIG. 7). A second upper channel 80 is slidably mounted on top of the lower channel 70 and is also connected with the seat 8. Further mounted on the top of the lower channel 70 is saddle member 81.

In the embodiment illustrated, the back plate 16 of adjuster 107 is fixed with the vehicle 75 floor. However, the back plate 16 could be fixed with the lower 80 or upper channel 80 if desired. The cams 31 and 42 have pivotal axes (35, 45) that are fixed with respect to lower channel 70. Torsion springs 65 ensure that the cams 31 and 42 are normally in an engaged position wherein relative movement between the upper 80 and lower 70 channels is prevented. A pull on cable 58 will cause handle 50 to act in a manner as previously described to allow relative motion between the upper 80 and lower 70 channels.

While a few of the embodiments of the present invention have been explained, it will be readily apparent to those skilled in the art that there are various modifications which can be made to the present invention without departing from the spirit and scope of this invention as it is encompassed by the following claims.

The embodiments of the invention in which an exclusive property or privilege is claimed are defined as follows:

1. A seat adjuster for a vehicle recliner seat, said seat having a first member providing a seat back pivotally mounted with respect to a second member providing a seat cushion, said seat adjuster in combination comprising:
   a rod pivotally connected to one of said seat members;
   a first cam pivotally connected to said other seat member along a pivotal axis fixed with respect to said other seat member, said first cam having an arm, and said first cam is in rolling contact with said rod whereby generally linear movement of said rod in a first direction causes rotation of said first cam to capture said rod with said other seat member;
   a second cam pivotally connected to said other seat member along a pivotal axis fixed with respect to said other seat member, said second cam having an arm, and said second cam is in rolling contact with said rod whereby generally linear movement of said rod in a direction opposite said first direction causes rotation of said second cam to capture said rod with said other seat member; and
   selectively operable handle means pivotally mounted with respect to said other seat member between said first and second cams, said handle having first and second flange means for contacting said first and second cam arms to disengage said first and second cams from rolling contact with said rod whereby the angle of inclination between said first and second members can be adjusted.

2. A seat adjuster as described in claim 1 wherein said rod is pivotally connected with said seat back.

3. A seat adjuster as described in claim 2 having a back plate mounted to said seat cushion and wherein said first and second cams are pivotally connected to said back plate.

4. A seat adjuster as described in claim 3 wherein said first and second cams have arms and wherein said latch has a handle pivotally mounted with respect to said back plate to contemporaneously contact said arms to provide the means to selectively disengage said first and second cams from rolling contact with said rod.

5. A seat adjuster as described in claim 3 wherein said rod has a flange and a spring is captured between said back plate and said flange to bias said seat back to an upright position.

6. A seat adjuster for a vehicle recliner seat, said seat having a seat back pivotally mounted and angularly reclinable with respect to a seat cushion, said seat adjuster in combination comprising:
   a rod pivotally connected with said seat back with a flange;
   a back plate fixably connected with said seat cushion having a lower surface generally aligned with said rod;
   a spring captured between said back plate and said flange of said rod biasing said seat back to an upright position;
   a first cam member pivotally connected to said back plate with an arm projecting generally horizontally and in rolling contact with the top of said rod whereby generally forward linear movement of said rod causes rotation of said first cam to capture said rod with said back plate;
   a second cam pivotally connected with said back plate and in rolling contact with the top of said rod with an arm projecting generally horizontally wherein rearward linear movement of said rod causes rotation of said second cam to capture said rod with said back plate;
   a selectively operable handle pivotally mounted with respect to said back plate between said first and second cams said handle having first and second flange means for contacting said first and second cam arms to disengage said first and second cams from rolling contact with said rod whereby the angle of inclination of said seat back with respect to said seat cushion can be adjusted.

7. A seat adjuster for a vehicle, said adjuster in combination comprising:
   a lower channel for connection with said vehicle;
   an upper channel slidably mounted fore and aft on said lower channel, said upper channel being connected with said seat;
   a first cam having a pivotal axis fixed with respect to one of said upper or lower channels said first cam having an arm, and said first cam is in rolling contact with said other channel wherein generally linear movement of said upper channel in a fore direction causes rotation of said first cam to capture said other channel with said one channel;
   a second cam having a pivotal axis fixed with respect to one of said upper or lower channels said second cam having an arm, said second cam is in rolling contact with said other channel wherein generally linear movement of said upper channel in an aft direction causes rotation of said second cam to capture said other channel with said one channel; and
   selectively operable handle means pivotally mounted with respect to one of said upper or lower channels, said handle having first and second flange means for contacting said first and second cam arms to disengage said first and second cams from rolling contact with said other channel whereby the position of said upper channel with said lower channel can be adjusted.

* * * * *